: 2,996,099
Patented Aug. 15, 1961

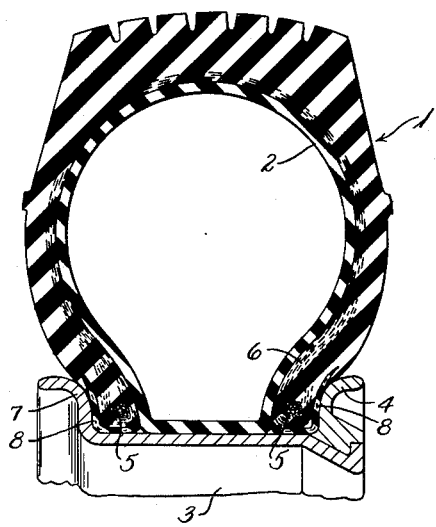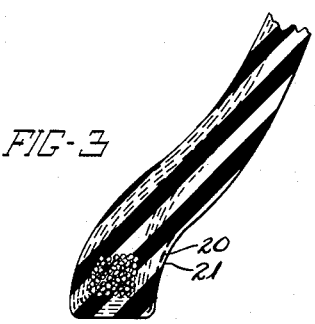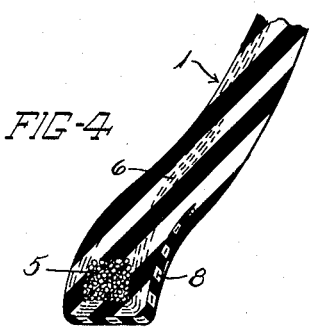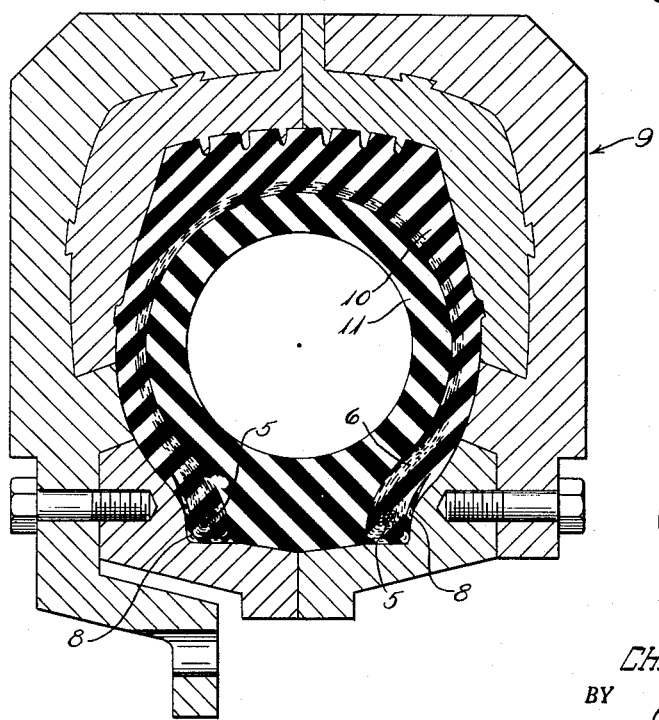

2,996,099
TIRE CHAFER ABRASION GUM STRIP COMPOSITION

Chester A. McCall, Cuyahoga Falls, Ohio, assignor to The Firestone Tire & Rubber Company, Akron, Ohio, a corporation of Ohio
Filed July 28, 1955, Ser. No. 525,036
6 Claims. (Cl. 152—362)

This invention relates to a new composition of matter and more particularly to a new composition of matter useful as an improved chafer element for the bead of a pneumatic tire.

A pneumatic tire relies for stability on two annular metal bead portions designed for securing the tire to the rim of the wheel of a vehicle and covered by rubber insulated fabric of the tire body. In building a tire, the fabric plies of the body of the tire are turned alternately up and down around each of the metal beads to secure the tire body to the beads. The turned-up body fabric is then covered with a rubber coated fabric chafer strip to protect the outer surface of the beads from rubbing by the flange of the rim. Difficulty is encountered with this construction in that the rubber on such a chafer strip is squeezed out of position to expose the fabric during vulcanization of the tire. When the tire is mounted, wheel rotation causes the rim flange to rub against the bead area of the tire to produce scuffing, abrasion and cutting of the exposed fabric. As the fabric slowly deteriorates from this action, sand and grit work between the plies of fabric to cause ply separation with resulting tire failure.

It also has been proposed to protect the surface of tire bead from the rim flange by the use of a vulcanized rubber strip over the body plies in the bead area of the tire. Difficulties have been encountered in using such a rubber strip in that the rubber also squeezes out of position during vulcanization of the tire to expose the body fabric in the area between the heel of the bead and the sidewall of the tire where the greatest protection from the rim flange is required. The fabric of the body, thus denuded of the rubber coating is unsatisfactory protection to the bead from the rubbing of the rim, since fabric alone has little chafe resistance.

The present invention overcomes the failing of the prior art chafer by providing a novel rubbery material which, when used as a rubbery chafer element, will not flow during vulcanization of the tire. This material is comprised of a rubbery composition containing discrete particles of previously vulcanized rubber having clearly defined shape and dimensions. In one form of the invention, the shape of the pre-vulcanized rubbery particles is substantially prismatic.

It is therefore an object of this invention to provide means for protecting the bead portion of a pneumatic tire from the chafing action of a rim on which the tire is mounted.

Another object of this invention is to provide a chafer element containing a high loading of ground previously vulcanized rubbery particles which will resist flow during vulcanization of the tire and thereby maintaining the desired thickness of rubber on the bead.

A further object of the invention is to provide means for maintaining a thickness of rubbery polymeric material in position in the chafer area of the bead of a tire during vulcanization.

Yet another object of the invention is to provide an unvulcanized chafer element for a tire comprised of previously vulcanized particles in a matrix of rubbery polymeric material. These and other objects of the invention will be apparent with reference to the specification, claims and drawings of which:

FIGURE 1 is a sectional view of a tire in accordance with the invention mounted on a rim;

FIGURE 2 is a sectional view of a steam-heated tire vulcanizing mold enclosing a tire mounted on a water bag illustrating the position of the novel chafer during vulcanization of the tire;

FIGURE 3 is a sectional view of a tire bead of the prior art after vulcanization illustrating the position of the chafer;

FIGURE 4 is a sectional view of a tire bead after vulcanization illustrating the position of the novel chafer;

FIGURE 5 is a sectional view of a tire showing a modification of the chafer of the invention.

In reference to FIGURE 1, a pneumatic truck tire generally indicated at 1 containing a tube 2 is held against axial movement on a rim 3 by locking ring 4. Tire 1 is provided at its marginal edges with annular metallic bead elements 5 held to the tire body by the upturned edges of fabric plies 6. Plies 6 are protected from the rubbing of the rim flange 7 and the locking ring 4 by chafers 8. Abrasion and damage to the tire occurs during rotation of the wheel during which slight play and axial rocking of the tire bead rubs the outer surface of the bead against the rim flange 7 and the side ring 4.

FIGURE 2 shows a tire vulcanizing mold 9 of the steam-heated type containing unvulcanized tire 10 which encloses a water bag 11. During vulcanization of the tire, a pressure on the order of 175 pounds per square inch is exerted outwardly against the inner walls of the water bag to force the tire 10 against the mold and this pressure combined with the heat of vulcanization softens the rubber and squeezes it away from the bead portion to expose the chafer fabric. This flow of rubber occurs because the shoulder of mold 9 adjacent to chafer 8 of the bead abuts into the surface contour of the tire with the result that when heat and pressure are applied internally against the tire, the chafer rubber is softened and squeezed away from the chafer fabric adjacent mold shoulders.

Prior to the present invention, tires when removed from the molds after the vulcanizing operation, had bead shapes as shown in FIGURE 3 wherein chafer fabric 20 is exposed or only lightly covered with rubber as shown at 21. However, with the novel chafers 8 or 31 (FIGURE 5) which are resistant to flow during vulcanization, the tire fabric is not laid bare and the desired protective cover remains on the fabric.

In the present invention, a chafer which resists "squeezing" during vulcanization is prepared by mixing large quantities of previously vulcanized discrete particles of a rubbery polymeric material with a vulcanizable unvulcanized rubbery stock which forms a matrix. The size of such particles should be such that 100% will pass through screens of 4 to 16 mesh and preferably from 8 to 10 mesh. In one form of the invention, the particle shape is substantially prismatic.

Novel rubbery chafer stocks, according to the invention, are shown in the following example:

*Example I*

|  | A | B |
|---|---|---|
| Natural Rubber | 100 | 100 |
| Carbon Black | 100 | 50 |
| Antioxidant | 2.0 | 2.5 |
| Sulfur | 3.0 | 2.5 |
| Accelerator | 0.5 | 0.5 |
| Zinc Oxide | 15.0 | 3.0 |
| Stearic Acid | 2.5 | 2.5 |
| Softener | 13.0 | 4.0 |
| Particles | 300 | 300 |
|  | 536.0 | 465.0 |

Although in the example, a loading of pre-vulcanized rubber particles of 300 parts based on 100 parts of unvulcanized rubber hydrocarbon is set out, it has been found that a concentration of rubber particles from 100 to 400 parts is satisfactory in the invention.

The material shown in Example I may be mixed on an open two roll mill or in a closed mixer such as a Banbury mixer to obtain the dispersion of the pigments. The resulting rubber stock may be calendered into sheets which are in turn cut into strips to provide chafer elements for tires. If desired, the stock may be calendered onto fabric to form the chafer element. The chafer element then may be built into the tire at positions shown at 8 in FIGURES 1 and 2, the tire vulcanized with little or no rubbery material being displaced during vulcanization. In the modification shown at 31 in FIGURE 5, no chafer fabric is used. A strip of rubbery material of the invention, either semicured before assembly with the other elements of the tire or assembled in the unvulcanized state, is in the desired position after the tire is vulcanized.

When run on a vehicle under road conditions, a tire having the novel chafer vulcanized in place resists the rubbing and abrasion of the tire rim flange. The result is a tire which gives longer road life.

The success of the novel composition in resisting flow during vulcanization of the tire lies in the size and shape of the discrete pre-vulcanized rubbery particles. In this invention, the use of rubbery particles having shape of prism and preferably of a particle having a substantially cubical shape is desired. Although the invention is not to be limited by an explanation of the function of the particles in the novel composition, it is thought that the discrete particles having definite shapes provide very constricted avenues of flow for the hot fluid matrix rubber surrounding the particles during the period of vulcanization. The particles probably hold the molding surface spaced from the incompressible fabric of the tire as well and also restrict the flow of rubber in the chafer. Regardless of the reason for success of the invention, the fact remains that a new composition of matter and a new and useful tire chafer composed thereof have been developed.

Among the rubbery materials useful as the matrix of the chafer i.e., the material which surrounds the discrete particles are natural rubber and synthetic rubbers including rubbery copolymers of butadiene and styrene, and butadiene and acrylonitrile, as well as rubbery polymers of chlorobutadiene.

Among the accelerators useful in the novel composition are the thiazoles, the dithiocarbamates, the thiuram sulfides, for example, benzothiazole disulfide, mercaptobenzothiazole, cyclohexylbenzothiazole sulfenamide and zinc dimethyl dithiocarbamte. Magnesium oxide among others is useful for accelerating the polychlorobutadiene types of polymers. Also available are the aldehyde-amine and guanidine type accelerators such as formaldehyde ammonia and diphenylguanidine, and many more known to those versed in the art of rubber compounding.

Although all types of carbon black are usable in the invention, abrasion resisting blacks such as easy processing channel, high abrasion furnace, and super abrasion furance blacks as well as others well known to those skilled in the art are preferred.

Other compounding ingredients known to those in the art may be used as necessary.

In the claims:

1. In a pneumatic tire a rubbery tread portion superimposed on and bonded to a vulcanized rubberized fabric body portion terminating at its edges in two inextensible bead portions covered on their axially outer surfaces by a vulcanized rubbery sheet, said rubbery sheet comprised of a vulcanized rubber compound as a matrix in which are dispersed discrete prismatic-shaped particles of ground, previously vulcanized rubbery material.

2. A pneumatic tire according to claim 1 wherein the ground previously vulcanized rubbery material is of a particle size such that all will pass through a screen having 16 openings per inch.

3. A pneumatic tire according to claim 1 wherein the ground previously vulcanized rubbery material is present in from 100 to 400 parts by weight based on the rubber hydrocarbon content of said compound.

4. A pneumatic tire according to claim 1 wherein the ground previously vulcanized rubbery material is present in about 300 parts by weight based on the rubber hydrocarbon content of said compound.

5. A pneumatic tire according to claim 1 wherein the ground previously vulcanized rubbery material is present in from 100–400 parts by weight based on the rubber hydrocarbon content of said compound and of a particle size such that all will pass through a screen having 16 openings per inch.

6. In a pneumatic tire a rubbery tread portion superimposed on and bonded to a vulcanized rubberized fabric body portion terminating at its edges in two inextensible bead portions covered on their axially outer surfaces by a vulcanized rubbery sheet, said rubbery sheet comprised of a vulcanized rubber compound as a matrix in which are dispersed discrete particles of ground, previously vulcanized rubbery material.

References Cited in the file of this patent

UNITED STATES PATENTS

| 2,563,787 | Keefe | Aug. 7, 1951 |
| 2,643,234 | Backus | June 23, 1953 |
| 2,656,324 | Te Grotenhius | Oct. 20, 1953 |
| 2,822,026 | Willis | Feb. 4, 1958 |

OTHER REFERENCES

Scott-Transactions, Institute of Rubber Industries, August 1944, pages 60, 61.